Aug. 30, 1927. 1,640,477
J. H. YOUNG
TESTING APPARATUS FOR VENTILATORS
Filed Oct. 1. 1924
Fig. 1.
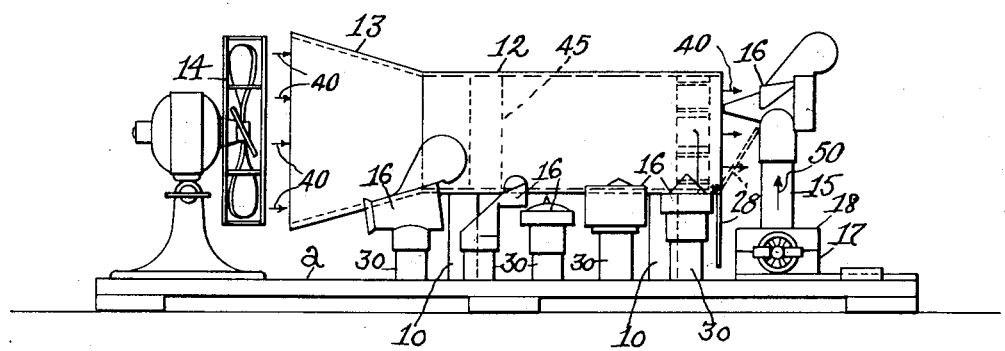
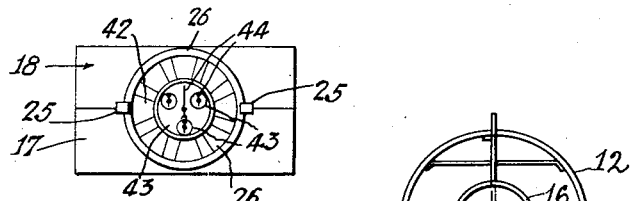
Fig. 4.
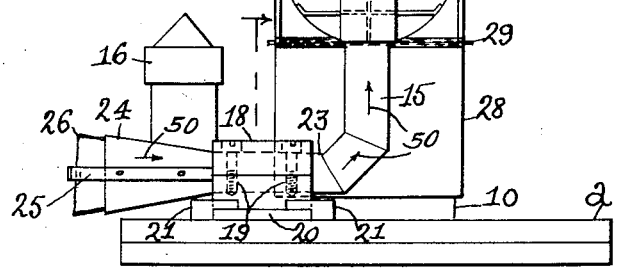
Fig. 2.
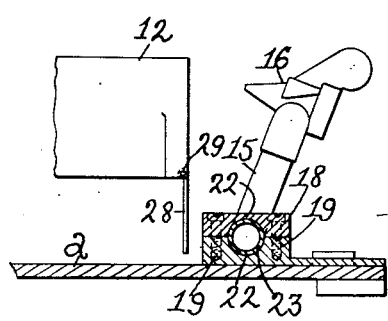
Fig. 3.
Inventor:
James Howard Young
by Jas. H. Churchill
Atty.

Patented Aug. 30, 1927.

1,640,477

UNITED STATES PATENT OFFICE.

JAMES HOWARD YOUNG, OF PITTSBURGH, PENNSYLVANIA, ASSIGNOR TO H. H. ROBERTSON COMPANY, OF PITTSBURGH, PENNSYLVANIA, A CORPORATION OF PENNSYLVANIA.

TESTING APPARATUS FOR VENTILATORS.

Application filed October 1, 1924. Serial No. 741,092.

This invention relates to apparatus for testing ventilators within a building under artificially created air conditions similar or analogous to those to which the ventilators are subjected under atmospheric conditions outside of the building.

The invention is particularly adapted to be embodied in a portable unit, capable of being readily carried by a ventilator salesman from one architect's office to another for purpose of demonstrating the comparative value or efficiency of different makes of ventilators.

In the present instance is shown a preferred form of portable testing unit having a supporting base upon which is mounted means for artificially obtaining a uniform flow or current of air, a miniature air stack or pipe, upon which the ventilator to be tested is placed and arranged to have the artificially created air current directed against it, so as to draw air through the miniature stack and the ventilator thereon in a manner analogous to that in which the wind draws air and gases through the eduction pipe of a ventilator erected upon a building, and means for measuring the air drawn through the miniature stack and the ventilator.

The miniature stack or pipe may and preferably will be adjustably mounted for purposes as will be described.

Provision may be made for directing the air current against the ventilator from different angles, as will be described.

These and other features of this invention will be pointed out in the claims at the end of this specification.

Fig. 1 is a side elevation of a ventilator testing apparatus embodying this invention.

Fig. 2, an end elevation looking toward the left in Fig. 1, on an enlarged scale.

Fig. 3, a section on the line 3—3, Fig. 2 and Fig. 4, an enlarged end view of the air pipe or stack to illustrate the anemometer therein.

Referring to the drawings, a represents an oblong portable base of wood or other suitable material, upon which the parts of the apparatus are suitably mounted to be moved therewith as a unit.

Supported above the base a by suitable uprights 10 is a relatively large and long pipe 12 having a conical, enlarged portion 13 at its air inlet end and with which cooperates an electrcially-actuated fan 14 of known construction, which is mounted on the base a. The pipe 12 forms an air tunnel through which a current of air indicated by the arrows 40 is forced by the fan 14, and the outlet end of said tunnel has cooperating with it a miniature stack or air pipe 15, upon the upper end of which is detachably mounted a relatively small ventilator 16 to be tested.

The stack or air pipe 15 is mounted in a support herein shown as a block 17 provided with a removable cap 18, which is secured to the block 17 by screws 19 (see Figs. 2 and 3). The block 17 is mounted on the base a to slide thereon toward and from the tunnel 12, and for this purpose the block 17 is provided with an extension 20 movable in guides 21 secured to the base a.

By means of the sliding block 17, the miniature stack or pipe 15 may be moved bodily toward and from the outlet end of the tunnel to permit different sizes or constructions of ventilators to be properly adjusted with relation to the air tunnel. The block 17 and its cap 18 are provided with substantially semi-circular recesses 22 for the reception of a horizontal portion or branch 23 of the stack or pipe 15, so that the latter may be rotated in the block 17 and thereby move the upright portion of the pipe or stack into various upright positions so as to present the ventilator thereon in different angular positions with relation to the air stream 40 issuing from the tunnel, whereby the ventilator may be tested with the air stream striking it at different angles.

The horizontal branch 23 of the air pipe or stack may be provided with a conical extension 24 having secured to it bars or arms 25 for supporting an anemometer 26 of known construction by means of which air drawn into the stack may be measured. The anemometer is shown on a larger scale in Fig. 4 and comprises a casing 26 having mounted therein a light fan 42 and dials 43 on which the revolutions of the fan are indicated by pointers 44. The air stream 40 acts on the miniature ventilator 16 in the same manner as the wind or atmospheric air currents act on the full size ventilators erected upon the eduction pipe or stack of the building on which the ventilator is placed, and draws a current of air through the anemometer 26, the miniature stack or pipe 15 and the ventilator 16 thereon. This current of air is indicated by the arrows 50.

The tunnel 12 may have co-operating with it a baffle or deflecting plate 28, which is represented as pivoted at 29 to the underside of the tunnel and normally hangs down below the outlet mouth of the tunnel, as indicated by full lines in Figs. 1 and 3, so as not to interfere with the air stream 40 issuing from the tunnel. When however it is desired to subject the ventilator to the action of an air current 40 flowing upwardly at an angle to the normal horizontal flow, the baffle or plate 28 is moved into an inclined position, represented by dotted lines in Fig. 1, and its free end rests against the ventilator, whose support 17 has been first moved away from the tunnel to permit this adjustment of the baffle and then moved toward the tunnel to position the ventilator with relation to the tunnel and the baffle.

The base a may and preferably will be provided with a plurality of stationary supports 30 for different types or styles of minature ventilators, and in the present instance five such supports are shown, upon which are detachably mounted five different constructions of miniature ventilators.

The velocity of the air stream or current 40 passing through the tunnel may be measured by an anemometer 45 placed in the tunnel and indicated by dotted lines in Fig. 1. The anemometer 45 is of the same construction as the anemometer 26.

The portable testing unit is especially designed to be used by salesmen to demonstrate to architects and builders the comparative efficiency or value of different makes of ventilators, whereby the architect or builder in his office is furnished with data as to the efficiency of the different ventilators under artificial air conditions similar or analogous to those to which the ventilator will be subjected when erected upon the building.

The simplicity of the apparatus is such that the architect or builder if he cares to, can make the tests. All that is necessary is to place each miniature ventilator to be tested upon the miniature stack or pipe 15, adjust the stack with relation to the air tunnel 12, connect the electric fan 14 with a lighting fixture in the office and take the proper readings on the anemometer 45 within the air tunnel and the anemometer 26 in the stack or pipe 15.

By means of the anemometer 45 within the tunnel, the velocity of the air current flowing therethrough is made known, so that each ventilator may be tested under the same air conditions and said anemometer may be read from the outlet end of the tunnel.

One construction or arrangement of testing apparatus is herein shown but it is not desired to limit the invention to the particular construction shown.

What I claim is:

1. In a ventilator testing apparatus, in combination, a portable base, an air tunnel mounted on said base, means mounted on said base and co-operating with said tunnel to pass a current of air therethrough, an air stack co-operating with the outlet end of said tunnel, means for mounting said air stack on the base, said air stack being adapted to have a ventilator to be tested detachably mounted thereon and so arranged with relation to the outlet end of said tunnel as to be acted upon by the current of air passing from said tunnel to thereby draw air through said stack, and means for measuring the air drawn through said air stack.

2. In a ventilator testing apparatus, in combination, a portable base, an air tunnel mounted thereon, an air stack adapted to have a ventilator to be tested detachably mounted thereon, a support for said air stack co-operating with said base and arranged with relation thereto to present the ventilator to be tested to the outlet end of said tunnel so as to be acted upon by the current of air passing from the tunnel to thereby draw air through said stack, and means co-operating with said tunnel to create an air current therethrough.

3. In a ventilator testing apparatus, in combination, a portable base, an air tunnel mounted on said base, means for creating a current of air in said tunnel, an air stack co-operating with the outlet end of said air tunnel, a support for said air stack, said air stack being adapted to have a ventilator to be tested thereon and so arranged as to be acted upon by the air current issuing from said tunnel, and a deflector interposed between said tunnel and ventilator to deflect the air stream issuing from the tunnel against said ventilator at an angle thereto.

In testimony whereof, I have signed my name to this specification.

JAMES HOWARD YOUNG.